United States Patent
Kitamura et al.

[15] 3,683,244
[45] Aug. 8, 1972

[54] CERAMIC CAPACITOR

[72] Inventors: Toshinori Kitamura, Kyoto; Yoshio Ajichi; Itaru Miyata, both of Kameoka; Masayoshi Ono, Kyoto, all of Japan

[73] Assignee: Nichicon Capacitor, Limited, Karasuma, Nakagyo-ku, Kyoto, Japan

[22] Filed: Feb. 11, 1971

[21] Appl. No.: 114,482

[30] Foreign Application Priority Data

Feb. 17, 1970   Japan ..................45/15500

[52] U.S. Cl..............................317/261, 317/242
[51] Int. Cl. .........................................H01g 3/00
[58] Field of Search...........................317/261, 242

[56] References Cited

FOREIGN PATENTS OR APPLICATIONS

741,019   11/1955   Great Britain.............317/242

Primary Examiner—E. A. Goldberg
Attorney—Eugene E. Geoffrey, Jr.

[57] ABSTRACT

A ceramic capacitor having a body of dielectric material formed of two halves with at least one inner and one outer electrode on opposite sides thereof, the inner electrodes being conductively bonded one to the other with an electrode terminal extending through said body and in conductive relationship to said inner electrodes.

3 Claims, 6 Drawing Figures

PATENTED AUG 8 1972  3,683,244

INVENTORS
TOSHINORI KITAMURA
YOSHIO AJICHI
ITARU MIYATA
MASAYOSHI ONO
BY
*Eugene E. Geoffrey*
ATTORNEY 3,683,244

CERAMIC CAPACITOR

This invention relates to an improved ceramic capacitor and particularly to a passing-through type ceramic capacitor which may be readily mounted on a chassis or the like and used at high voltage.

A prior known ceramic capacitor of the passing-through type comprises a cylindrical ceramic dielectric body having a central axial opening extending therethrough and a rod-shaped inner electrode terminal passing through the opening. According to a conventional method of manufacturing such a ceramic body, powdered dielectric material is formed in shape by molding and then sintering, and the center hole is thereafter bored by machining, because, if the central hole is previously formed by molding, the density distribution of the powdered material is often nonuniform and good electrical characteristic cannot be obtained. However, such machining process is rather costly and results in an expensive capacitor. Moreover, in the case of packing the assembly with synthetic resin, it is difficult to completely fill the gap between the inner surface of the central hole and the inner electrode terminal with the resin and this sometimes causes a spark discharge therebetween.

Therefore, one object of this invention is to propose a novel and improved structure of the passing-through type ceramic capacitor which overcomes the above disadvantages.

According to this invention, the dielectric body of the capacitor consists of a pair of ceramic bodies each having at least one inner electrode on one face and an outer electrode on the opposite face and bonded together by adhering the inner electrodes of the both ceramic bodies with electroconductive adhesive agent or solder and placing an inner electrode terminal rod between the inner electrodes.

Other objects and features of this invention will be more clearly understood from the following description with reference to the accompanying drawings.

In the drawings.

Throughout the drawings, like reference numerals are used to denote like structural components and synthetic resin coatings are not shown for purposes of simplification.

Figure 1A:
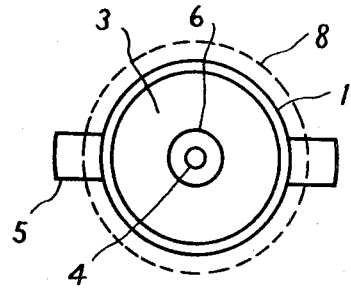
FIGS. 1A and 1B are respectively a plan view and a sectional side view of passing-through type ceramic capacitor according to the prior art.
Figure 1B:
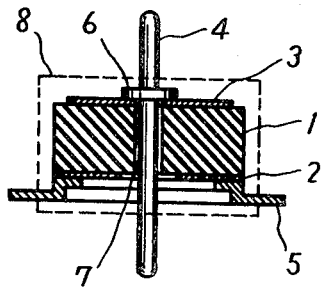

Referring to FIG. 1 representing an example of the prior art, a cylindrical ceramic body 1 has an outer electrode 2 and an outer electrode 3 respectively formed on the both surfaces thereof and a central opening 7 bored therein. An annular stepped outer electrode terminal 5 is soldered to the outer electrode 2 and a rod-shaped inner electrode terminal 4 having a flange 6 is inserted in the opening 7. The flange 6 is soldered to the electrode 3. The assembly is packed or coated with synthetic resin in the shape as shown by a dashed line 8.

As previously described, the through-hole or central opening must be formed by a costly machining process after sintering the ceramic body 1. Moreover, it is very difficult to fill the gap between the inner wall of the through-hole 7 and the inner electrode terminal 4 with the synthetic resin and this causes spark discharges therebetween.

Figure 2A:
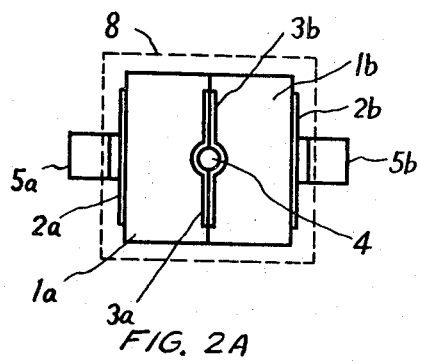
FIGS. 2A and 2B are respectively a plan view and a sectional side view representing an embodiment of passing-through type ceramic capacitor according to this invention.
Figure 2B:
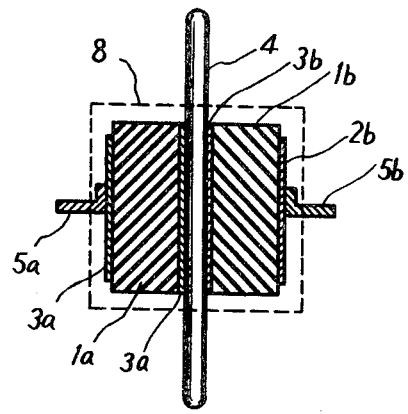

Referring now to FIG. 2 representing an embodiment of ceramic capacitor according to this invention, the dielectric body consists of a pair of rectangular ceramic plates 1a and 1b which are bonded together. The bonded surfaces of the both ceramic plates have inner electrodes 3a and 3b respectively and the both electrodes 3a and 3b are formed respectively over semi-circular grooves previously formed in the surfaces of the both ceramic plates. The semi-circular grooves form a circular axial through-hole or opening when the both ceramic plates are bonded and a rod-shaped inner electrode terminal 4 passes through the hole. Outer electrodes 2a and 2b are respectively formed on the opposite sides of the ceramic plates 1a and 1b and L-shaped outer electrode terminals 5a and 5b are respectively soldered to the terminals 2a and 2b. The whole assembly is enclosed within synthetic resin as shown by a dashed line 8.

In manufacture of this capacitor, the ceramic plates 1a and 1b are first prepared by a conventional molding and sintering method. The axial semi-circular groove can be previously formed by molding without affecting uniformity of the density of the material and accordingly, the electrical characteristic of the products. Electroconductive paste is applied to predetermined areas on the both faces of the ceramic plates and then heat-treated to form the outer and inner electrodes 2a, 2b, and 3a and 3b. An electroconductive adhesive agent or solder paste is then applied to the surfaces of the inner electrodes 3a and 3b and the rod-shaped inner electrode terminal 4 is placed in the groove of one ceramic plate. The other ceramic plate is then placed thereon and the assembly is heated to complete the bonding. The outer electrode terminals 5a and 5b and the resin package 8 can be applied by use of conventional methods.

According to this invention, the ceramic plates can be easily and precisely shaped to have uniform quality and the shrinkage of products can be remarkably reduced. Moreover, the cost of production can be also reduced because of elimination of machining processes such as hole boring. In addition, since the inner electrode terminal 4 is intimately bonded to the inner electrodes 3a and 3b, there is no gap to cause spark discharges as in the prior capacitor. It is also easy to design the capacitor to have a large capacitance and small size and it can be easily produced by mass production methods.

Figure 3A:
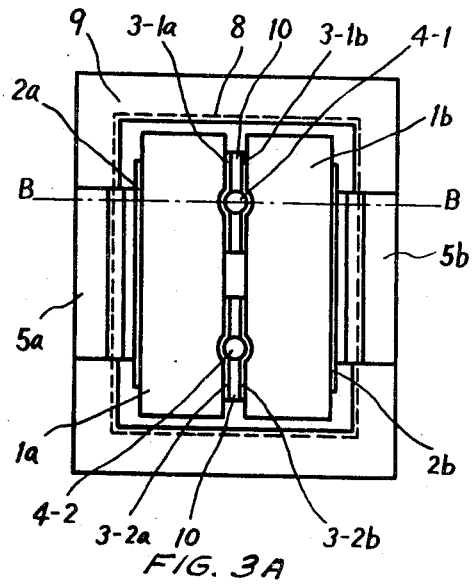
FIG. 3A is a plan view representing another embodiment of passing-through type ceramic capacitor according to this invention.
Figure 3B:
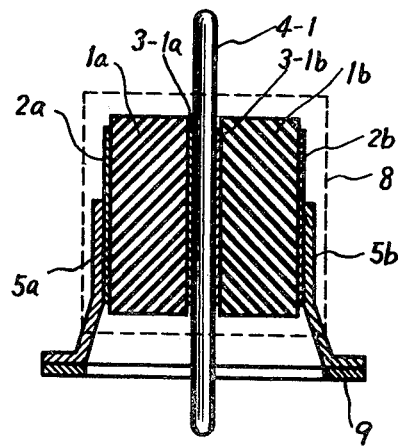
FIG. 3B is a sectional side view taken along the line B—B of FIG. 3A.

A modified form of capacitor according to the invention is shown in FIG. 3. This capacitor has a pair of inner electrode terminals 4–1 and 4–2 and is used in a double conductor circuit. According to the prior art, a double conductor circuit required two capacitors to be attached respectively to the both conductors and required considerable space. On the contrary, however, the capacitor of this invention for the double conductor circuit is only slightly larger in size than that for the single conductor circuit and there is little change in space requirements.

In FIG. 3, the dielectric body consists of a pair of ceramic plates 1a and 1b each having a pair of axial grooves for holding the inner electrode terminals 4-1 and 4-2. Over the axial grooves of the both ceramic plates, pairs of inner electrodes 3-1a, 3-2a and 3-1b and 3-2b are formed. Outer electrodes 2a and 2b are formed on the opposite sides of the ceramic plates 1a and 1b respectively. The areas of the inner and outer terminals are previously selected so as to provide specific characteristics. The inner electrodes of the both ceramic plates are bonded together with electroconductive adhesive agent or solder 10, after placing the inner electrode terminals 4-1 and 4-2 in the grooves. Outer electrode terminals 5a and 5b are respectively soldered to the outer electrodes 2a and 2b and a ground terminal 9 is soldered or welded to the terminals 5a and 5b. A synthetic resin enclosure or covering 8 is then applied as shown by the dashed line in the drawings.

The capacitor of FIG. 3 cannot only be manufactured as easily as the capacitor of FIG. 2 but also serves the function of two capacitors and requires little, if any, added space. Moreover, the inner electrode terminals can be increased similarly with increase of the number of conductors in the utilization circuit which affords a substantial saving in both space and cost. For example, in comparison to the prior art device, the volume of the device was reduced 80 percent and the cost to 70 percent in the case of double conductor circuit and in the case of triple conductors the volume was reduced 70 percent and the cost to 55 percent.

The illustrative embodiments are only for the purpose of explanation and many variations, modifications and changes can be made without departing from the spirit and scope of this invention. For example, the cross-section of the ceramic plate need not be rectangular as other shapes such as ovals and rectangular shapes with rounded corners can be used.

The ceramic capacitors of this invention have many uses and a capacitor having a plurality of inner electrodes and inner electrode terminals is particularly advantageous in use in a high frequency filters for blocking high frequencies from the heater circuit of high frequency oscillators including magnetrons.

What is claimed is:

1. A ceramic capacitor, comprising a ceramic dielectric body, at least one inner electrode, at least one outer electrode, at least one inner electrode terminal passing through said dielectric body and connected electrically to said inner electrode, and at least one outer electrode terminal connected electrically to said outer electrode, said dielectric body consisting of a pair of ceramic halves bonded together with said inner electrode terminal therebetween, said ceramic body being formed of two halves and each of said ceramic halves having an inner electrode formed one one face thereof and an outer electrode formed on the opposite face thereof and said inner electrodes of said both halves being bonded by a conductive adhesive material or solder with said inner electrode terminal being disposed between said inner electrodes.

2. A ceramic capacitor, comprising a ceramic dielectric body, at least one inner electrode, at least one outer electrode, at least one inner electrode terminal passing through said dielectric body and connected electrically to said inner electrode, and at least one outer electrode terminal connected electrically to said outer electrode, said dielectric body consisting of a pair of ceramic halves bonded together with said inner electrode terminal therebetween, said ceramic body being formed of two halves and each of said ceramic halves having a plurality of inner electrodes arranged on one face thereof and an outer electrode formed on the opposite face thereof, and said inner electrodes of said both halves being bonded by a conductive adhesive material or solder with a plurality of inner electrode terminals being respectively disposed between the facing pairs of the inner electrodes.

3. A ceramic capacitor, comprising a ceramic dielectric body, at least one inner electrode, at least one outer electrode, at least one inner electrode terminal passing through said dielectric body and connected electrically to said inner electrode, and at least one outer electrode terminal connected electrically to said outer electrode, said dielectric body consisting of a pair of ceramic halves bonded together with said inner electrode terminal therebetween, said ceramic body being formed of two halves and each of said ceramic halves consisting of a rectangular ceramic plate having said inner and outer electrodes on opposite sides thereof.

* * * * *